United States Patent [19]

Stacey et al.

[11] Patent Number: 4,729,890
[45] Date of Patent: Mar. 8, 1988

[54] POROUS ALUMINAS AND THEIR PREPARATION

[75] Inventors: Martyn H. Stacey, Cuddington; Stephen J. Wilson, Duxford, both of England

[73] Assignee: Imperial Chemical Industries PLC, London, England

[21] Appl. No.: 593,171

[22] Filed: Mar. 26, 1984

Related U.S. Application Data

[63] Continuation of Ser. No. 236,628, Feb. 20, 1981, abandoned.

[30] Foreign Application Priority Data

Feb. 26, 1980 [GB] United Kingdom ............... 8006409

[51] Int. Cl.$^4$ ................................................. C01F 7/02
[52] U.S. Cl. ........................................ 423/628; 423/625
[58] Field of Search ................................ 423/625, 628

[56] References Cited

U.S. PATENT DOCUMENTS

| | | |
|---|---|---|
| 3,417,028 | 12/1968 | Montgomery . |
| 3,436,434 | 4/1969 | Lester ............................ 423/628 |
| 3,669,904 | 6/1972 | Corneliues ..................... 423/628 |
| 3,773,691 | 11/1973 | Leach ............................ 423/628 |
| 3,974,100 | 8/1976 | Kubicek ......................... 252/463 |
| 4,010,242 | 3/1977 | Iler et al. ....................... 423/628 |
| 4,012,337 | 3/1977 | Michell .......................... 423/628 |
| 4,115,248 | 9/1978 | Mulaskey . |
| 4,117,105 | 9/1978 | Hertzenberg et al. .......... 423/628 |
| 4,172,809 | 10/1979 | Triki .............................. 423/628 |
| 4,224,302 | 9/1980 | Okamoto et al. .............. 252/463 |
| 4,267,071 | 5/1981 | Jaffe . |
| 4,301,037 | 11/1987 | Sanchez et al. ................ 423/628 |
| 4,315,839 | 2/1982 | Bouge et al. .................. 423/628 |

FOREIGN PATENT DOCUMENTS

| | | | |
|---|---|---|---|
| 49-98398 | 1/1973 | Japan ............................. 423/628 |
| 50-21319 | 7/1975 | Japan ............................. 423/628 |

OTHER PUBLICATIONS

Wefers et al, "Oxides and Hydroxides of Aluminum, Tech. Paper #19" Alcoa Research Labs., 1972, pp. 36-45, Table 14.

*Primary Examiner*—Robert L. Stoll
*Attorney, Agent, or Firm*—Cushman, Darby & Cushman

[57] ABSTRACT

An alumina comprising particles which are aggregates or agglomerates of primary particles in which the internal porosity is provided by micropores of predetermined average width within the range 4 to 20 Angstroms and in which the pore width over the majority of the pores is within 1 Angstrom of the predetermined value, and a method for producing such an alumina by heating a particulate hydrous alumina to dehydrate it under an atmosphere in which the partial pressure of water vapor is maintained essentially constant at a predetermined value.

8 Claims, 1 Drawing Figure

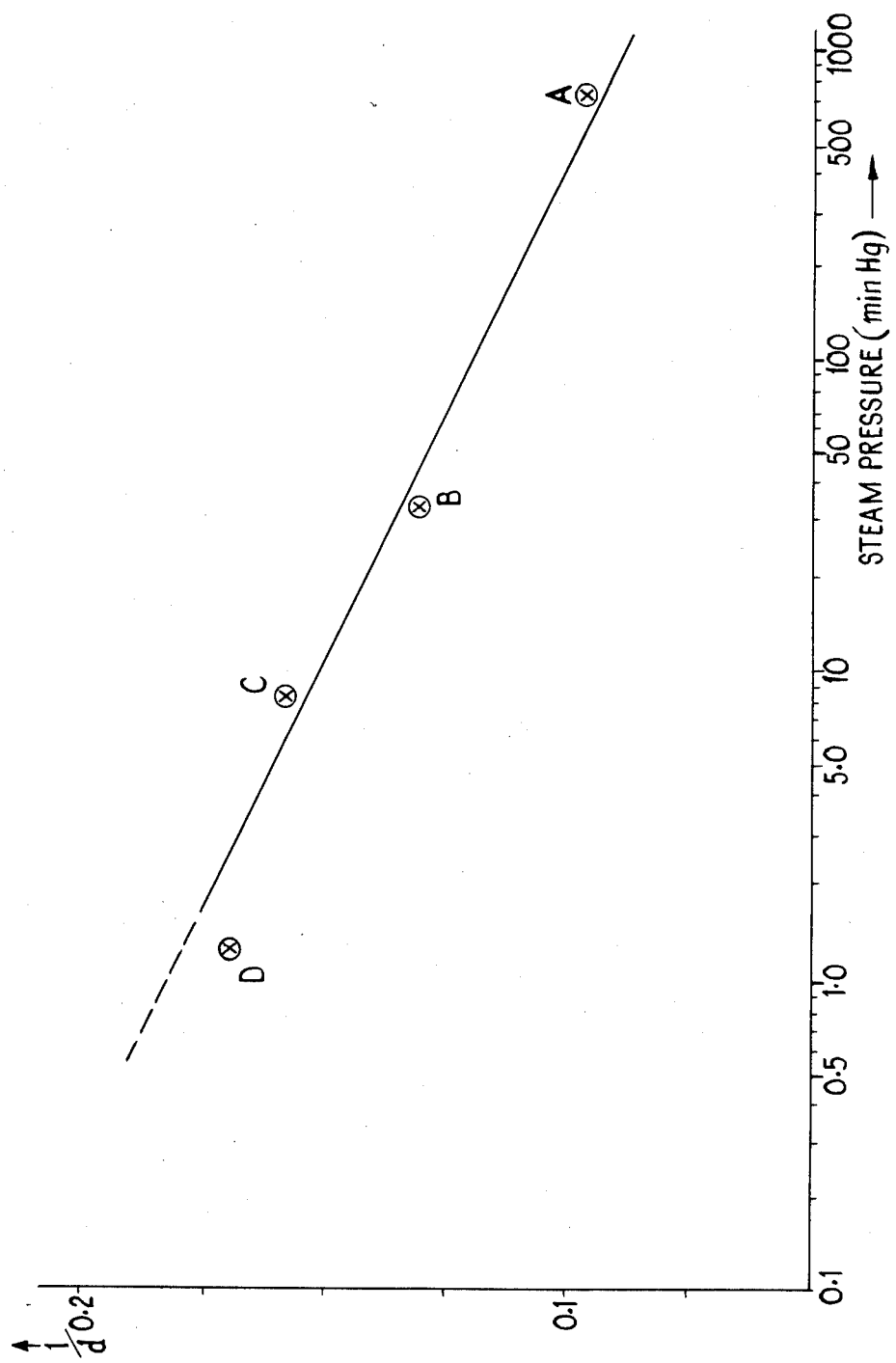

POROUS ALUMINAS AND THEIR PREPARATION

This is a continuation of application Ser. No. 236,628 filed Feb. 20, 1981, now abandoned.

This invention relates to porous aluminas of controlled pore size and narrow pore size distribution, and to a method for the preparation of such materials.

Porous aluminas are used extensively in industry, for example as catalysts, catalyst supports, selective absorbents and thermal insulation materials. They are generally prepared by precipitation of the hydrous metal oxide from a solution of a salt of the metal by addition of an acid or an alkali, followed by removal of vapour (usually water vapour) from the precipitate in a drying step. It is in the drying step that the porous structure of the material is created. Depending upon the conditions employed for drying the precipitated hydrous oxide, for example upon the rate at which the precipitate is heated and dried, the size of the pores in the dried material may vary over a wide range, for example from very fine pores of a few Angstroms width to large pores of several hundred Angstroms width.

The pore size and pore size distribution in alumina particles have an important influence upon the effectiveness and efficiency of that alumina for the intended use, and during the past few years considerable effort has been devoted to controlling the pore size and the pore size distribution in such materials. Methods which have been described for controlling the porosity of alumina include lowering the surface tension of the liquid being removed as vapour in the drying step by use of surfactants and/or organic solvents, use of organic (usually polymeric) additives which are co-precipitated with the hydrous alumina and subsequently removed by calcination, leaching treatments for enlarging the pores created by drying the alumina, foaming of the wet precipitates, and the use of carefully - controlled drying conditions such that the rate of removal of liquid from the alumina structure as vapour is controlled.

The methods described are particularly useful for creating large pores such as macropores of width (or diameter) greater than 1000 Angstroms in the aluminas. Some methods purport to enable close control to be exercised over the production of mesopores, even to the exclusion of macro pores. The methods purport to enable pore size distribution to be controlled so that pore sizes lie predominantly within a narrow range, for example at least 70% of the pores being mesopores of width within a range of less than a hundred Angstroms.

The present invention is concerned with aluminas comprising particles which are agglomerates or aggregates of primary particles in which the internal porosity within the primary particles is provided by micropores of controlled, predetermined width and wherein the pore width is substantially uniform, and with a method of producing such aluminas by control of the conditions under which vapour, particularly water vapour, is removed from hydrous alumina particles in the drying step of the production sequence.

According to the invention there is provided an alumina comprising particles which are agglomerates or aggregates of porous primary particles in which the internal porosity within the primary particles is provided by micropores of controlled, predetermined average width within the range of 4 to 20 Angstroms and in which the pore width over the majority of the pores is within 1 Angstrom of the predetermined value.

The pore size distribution (in terms of mean pore width) over the majority of pores in the primary alumina particles is within 1 Angstrom such that at least 90% of the pores have essentially the same pore width. Thus, for example, an alumina has been provided wherein more than 90% of the pores have a mean width of about 6 Angstroms, as is described in Example 3 hereinafter.

As stated hereinbefore, the invention is also concerned with a method of producing microporous aluminas of predetermined pore size by control of the conditions used to remove liquid as vapour from a precipitated hydrous alumina and according to a further feature of the invention there is provided a method for the production of an alumina comprising particles in which the internal porosity within the primary particles is provided by micropores of predetermined width in the range of 4 to 20 Angstroms which comprises heating a particulate hydrous alumina to remove water vapour therefrom under an atmosphere in which the partial pressure of water vapour is maintained essentially for constant at a predetermined value.

The moist atmosphere in which dehydration of the hydrous alumina is effected may be created by introducing (superheated) steam into the heating vessel, or alternatively by heating the hydrous alumina such that water vapour removed from the hydrous oxide creates the moist atmosphere.

Once the desired partial pressure of water vapour has been established within the vessel, this partial pressure can be maintained constant by removing water vapour from the vessel or adding water vapour to the vessel as necessary. In steady-state operation the rate of removal of water vapour from the vessel can be equal to the rate of evolution of water vapour from the hydrous oxide particles so that the partial pressure of water vapour in the vessel remains essentially constant. Provided that the partial pressure of water vapour is maintained constant at the predetermined value, the overall pressure of the atmosphere in the vessel may be atmospheric, subatmospheric or superatmospheric. In addition to water vapour, the atmosphere may comprise any vapour which is inert under the conditions prevailing in the vessel, for example air or an inert gas such as nitrogen gas.

The temperature at which the hydrous oxide particles are heated will usually be at least 150° C. and usually will be up to 500° C., depending to some extent upon the particular alumina being dehydrated. For example some hydrous aluminas can be dehydrated at temperatures as low as 150° C. or even lower, whilst other hydrous aluminas require higher temperatures to dehydrate them. As a guide, the preferred temperature range for heating boehmite is 400° C. to 500° C. whilst for gibbsite the preferred temperature range is 200° C. to 300° C. Any temperature at which vapour is removed from the particles may be employed providing the balance of temperature and pressure (and especially partial water vapour pressure) can be made to retain the necessary degree of control over the growth of pores in the particles.

The pressure under which the dehydration is effected, and especially the partial pressure of water vapour in the vessel, is critical to the obtention of uniform pores of controlled predetermined width. The partial pressure of water vapour more than any other factor determines the pore size in the primary alumina particles created, and the extent to which this partial pressure is maintained constant (within narrow limits) during the dehydration determines the pore size and the uniformity of pore size. In general, as a guide, increasing the partial pressure of water vapour results in an increase in the mean pore width of the pores created in the primary particles. Of course, if the partial pressure of water vapour is allowed to fluctuate greatly during the dehydration there is a danger that the pore size distribution will become broader due to the creation of pores of different sizes at different partial pressures of water vapour.

BRIEF DESCRIPTION OF THE DRAWING

The attached drawing illustrates the influence of the partial pressure of water vapour on the mean width of the pores created in the primary particles of alumina formed by dehydration of particulate boehmite.

The influence of the partial pressure of water vapour on the mean width of the pores created in the primary particles of alumina formed by dehydration of particulate boehmite is illustrated in the accompanying drawing which shows a graph of the inverse of mean pore width plotted against the partial pressure of water vapour. It will be seen from the drawing that providing the partial pressure of water vapour is constant, the mean pore width of the pores created in the primary particles of alumina will be essentially constant. Moreover, the drawing shows that in addition to enabling pore size distribution to be controlled within narrow limits, the method of the invention also enables primary particles containing pores of controlled, predetermined width to be produced. Of course, the drawing shows that if the partial pressure of water vapour is allowed to fluctuate during the dehydration, then the resulting pore size distribution may become broader.

The hydrous oxide is heated under the controlled conditions for a period of time such that dehydration of the particles has proceeded to the stage where further dehydration of the particles, for example in a subsequent operation, does not disrupt the pore configuration established in the primary particles. Preferably the particles are essentially completely dehydrated before the imposed and controlled conditions are dispensed with.

The time for which the controlled conditions need to be maintained may vary within wide limits from a few minutes to several hours depending for example upon the precise conditions employed and the efficiency and operational vagaries of the equipment used, but the maintaining of controlled conditions for longer than is strictly necessary does not adversely affect the pore size or pore size distribution in the resulting dehydrated particles. As a guide, the controlled conditions will usually be imposed for from about 30 seconds up to about 3 hours.

The particles of hydrous oxide are preferably agitated during the dehydration treatment such that escape of water vapour from the interior of any particle is directly into the gaseous atmosphere, i.e. the surface conditions of all of the particles as they emit water vapour are uniform. The formation of large agglomerates or of essentially stationary pockets of particles should be avoided since the creation of zones of different conditions (e.g. partial pressures of water vapour) on the surfaces of a particle such as might occur in agglomerates and stationary pockets of particles can adversely affect the size of the pores created in the particles. As vigorous an agitation of the particles as possible is preferred providing serious attrition of the particles is obviated. As an alternative to agitation of a bed of particles, the particles may be heated in a thin film.

The hydrous oxide particles, which are agglomerates or aggregates of primary particles of diameter up to about 5 microns, should preferably have all approximately the same shape and size although the actual shape and size is not important in itself. Preferably, the particles are of a size in the range of 10 microns to 2000 microns, although, obviously, smaller particles (i.e. smaller agglomerates of primary particles) may be treated.

In the case where the particles are agitated, the method of agitation is not critical and any technique may be used which ensures adequate agitation. Stirring, shaking, tumbling and fluidization are included amongst the techniques which may be employed.

The method of the invention may be carried out as a batch operation or as a continuous operation or as a combination of batch and continuous techiques.

The product of the method of the invention comprises particles made up of microporous primary particles in which the porosity is provided by micropores of predetermined, very uniform, mean pore width in the range of 4 to 20 Angstroms. The product may be used directly in this form if desired, for example as a molecular sieve or as a catalyst or catalyst support. It is to be understood, however, that the product may be incorporated into an alternative form of alumina which may contain mesopores and macropores in addition to the micropores. For example the dry particles produced by the invention may be converted into larger particles or shaped solid bodies or beds wherein the spaces provided by packing together of the small particles may create large pores in the larger body. Thus for example small particles of the invention may be wetted with water and allowed to agglomerate to provide bodies or beds having a network of relatively large pores (mesopores and/or macropores of mean width in excess of about 20 Angstroms and up to several thousand Angstroms) which large pores are in open communication with the small micropores in the primary alumuina particles. It is to be understood that bodies of this type derived from basic particles according to the invention but additionally having larger pores therein are included as a further feature of the present invention.

The invention is illustrated but in no way limited by the following examples:

EXAMPLE 1

Boehmite powder (0.1 g) of nominal crystal size 2 micron was spread on the pain of a micro balance to form a thin layer of less than 1 mm thickness. The tube was heated in a furnace and when the temperature of the powder reached 150° C. steam at 1 atmosphere pressure was passed over the powder at a flow rate of 85 ml/min (calculated at 100° C.). The temperature of the powder was raised stepwise over a period of 1.5 hours to 480° C. which temperature was maintained for 1.5 hours. The powder was then cooled to 200° C. after which the steam supply was stopped and steam in the furnace was purged away with dry nitrogen gas for 30 mins.

The particulate product was found by X-ray diffraction analysis to comprise 97% gamma alumina. The particles were porous and consisted of agglomerates of primary particles in which the pore width was determined by electron microscopy. Fragments of crushed product were transferred from a dispersion in ethanol to carbon film-coated copper grids and several fragments on each grid were examined at a magnification of about 100,000 times using Siemens 102 microscope with double-tilt stage, and photographs were printed at a magnification of 500,000 times.

The single crystal fragments upon which measurements were made were thin fragments positioned over holes in the carbon film on the grid and carefully tilted to within a few degrees of the [110]γ orientation, i.e. in a beam approximately parallel to the original long Boehmite "b" axis (12.227 Angstroms). To calibrate the electron microscope for the measurements, the relationship between real and nominal magnifications as a function of objective lens current for the instrument was checked by making measurements of lattice fringe spacings.

A regular lamellar porous structure of the primary particles was clearly visible in which the pores existed as slits rather than holes (hence the term "pore width" is used herein rather than the more usual term pore diameter). Micrographs were obtained at a variety of magnifications and multiple measurements were made per micrograph of the repeat distance, i.e. the distance occupied by one pore and one region of alumina in a direction perpendicular to the lamellar orientation of the crystals. For each sample of the order of 100 measurements were made on a number of plates (about 10). Pore widths were calculated from the repeat distance using the theoretical relationship that pore size is equal to 21% of the repeat distance (i.e. 0.21 × repeat distance) since there exists a unique topotactic relationship between boehmite and gamma-alumina structures.

A mean pore width of 10.5 Angstroms was found for the product. It was observed that the pores were of a substantially uniform size with the vast majority of pores having a width in the range of 10 to 11 Angstroms.

The result is recorded as Point A on the graph shown in the drawing (1/d=0.0952).

EXAMPLE 2

Boehmite powder (1 g) as in Example 1 was spread as a thin layer (thickness less than 1 mm) in a platinum boat in a furnace attached to a vacuum line. The flask was pumped down to 0.01 torr and then connected to a water reservoir maintained at room temperature (25° C.) so as to create in the flask a constant water vapour pressure of 25 torr irrespective of the temperature of the flask. The flask was heated at 450° C. for 24 hours and then allowed to cool to room temperature. The pressure in the flask was returned to atmospheric and the product was examined as described in Example 1.

The product was found to be 100% gamma alumina of primary particles of lamellar wherein the mean pore width was 7.6 Angstroms.

The result is recorded as point B on the graph shown in the drawing(1/d=0.132).

EXAMPLE 3

Boehmite powder (1 g) as in Example 1 was treated by the procedure described in Example 2 except that a concentrated sulphuric acid (SG.1.46) reservoir maintained at room temperature was used instead of the water reservoir so that the constant partial pressure of water vapour in the flask was 8 torr instead of 18 torr.

The product obtained after heating at 450° C. for 1 hour was found to be 94% gamma alumina of primary particles of lamellar structure wherein the mean pore width was 6.3 Angstroms.

The result is recorded as point C on the graph shown in the drawing (1/d=0.159)

EXAMPLE 4

In a further experiment in which the boehmite was heated under a constant partial water vapour pressure of 1.0 mm Hg a product comprising gamma alumina of primary particles having pores of mean width 5.9 Angstroms was obtained.

The result is recorded as point D on the graph shown in the drawing (1/d=0.169).

We claim:

1. A porous transition phase alumina obtained by the controlled dehydration of a particulate boehmite or gibbsite hydrous alumina and comprising particles which are aggregates or agglomerates of porous primary particles in which the internal porosity within the primary particles is provided by micropores of controlled average width within the range 4 to 20 Angstroms and wherein the pore width over the majority of the pores is within 1 Angstrom of the averaage pore width.

2. A transition alumina as claimed in claim 1 wherein at least 90% of the pores in the primary particles have essentially the same pore width.

3. A method as claimed in claim 1 wherein the particulate hydrous alumina is heated at a temperature of from 150° C. to 500° C. sufficient to dehydrate the alumina particles.

4. A method as claimed in claim 3 wherein the alumina is boehmite and the particles are heated at from 400° C. to 500° C.

5. A method as claimed in claim 3 wherein the alumina is gibbsite and the particles are heated at from 200° C. to 300° C.

6. A transition alumina as claimed in claim 1 wherein the alumina is gamma alumina.

7. A method for the production of a porous transition-phase alumina which comprises heating a particulate boehmite or gibbsite hydrous alumina to remove water therefrom whilst maintaining a controlled atmosphere above the particles in which the partial pressure of water vapour is maintained essentially constant at a value predetermined as suitable for producing pores of a desired average pore width within the range 4 to 20 Angstroms, to produce a transition phase alumina comprising particles which are aggregates or agglomerate of porous primary particles in which the pores created within the primary particles by removal of water therefrom are of controlled average width within the range 4 to 20 Angstroms and the pore width over the majority of the pores is within 1 Angstroms of the averagae pore width.

8. A method as claimed in claim 7 wherein the transition alumina is gamma alumina.

* * * * *